(12) United States Patent
Castellani et al.

(10) Patent No.: US 7,890,318 B2
(45) Date of Patent: Feb. 15, 2011

(54) INFORMING TROUBLESHOOTING SESSIONS WITH DEVICE DATA

(75) Inventors: Stefania Castellani, Meylan (FR);
Antonietta Grasso, Grenoble (FR);
Aaron N. Kaplan, Grenoble (FR);
Frederic Roulland, Le Versoud (FR);
Claude Roux, Grenoble (FR); Tracy E. Thieret, Webster, NY (US); Roger Kramer, Rochester, NY (US); Ronald M. Rockwell, Rochester, NY (US);
Donald J. Gusmano, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 892 days.

(21) Appl. No.: 11/805,456

(22) Filed: May 23, 2007

(65) Prior Publication Data

US 2008/0294423 A1 Nov. 27, 2008

(51) Int. Cl.
*G06F 17/28* (2006.01)
(52) U.S. Cl. .................. 704/9; 704/257; 704/7
(58) Field of Classification Search .............. 704/1, 704/3, 4, 7, 9, 10, 257, 270, 272, 251, 276; 714/25; 709/223; 1/1
See application file for complete search history.

(56) References Cited

U.S. PATENT DOCUMENTS

| | | | |
|---|---|---|---|
| 5,923,834 | A | 7/1999 | Thieret et al. |
| 6,263,335 | B1 | 7/2001 | Paik et al. |
| 6,405,162 | B1 | 6/2002 | Segond et al. |
| 6,571,236 | B1 * | 5/2003 | Ruppelt ............ 714/25 |
| 6,678,677 | B2 | 1/2004 | Roux et al. |
| 6,892,317 | B1 | 5/2005 | Sampath et al. |
| 6,915,300 | B1 | 7/2005 | Roux et al. |
| 6,947,923 | B2 | 9/2005 | Cha et al. |
| 6,970,881 | B1 | 11/2005 | Mohan et al. |
| 7,058,567 | B2 | 6/2006 | Aït-Mokhtar et al. |
| 7,305,465 | B2 * | 12/2007 | Wing et al. ......... 709/223 |
| 7,313,573 | B2 * | 12/2007 | Leung et al. ............. 1/1 |
| 2002/0111941 | A1 | 8/2002 | Roux et al. |
| 2003/0110412 | A1 | 6/2003 | Neville |
| 2003/0110413 | A1 | 6/2003 | Bernklau-Halvor |

(Continued)

FOREIGN PATENT DOCUMENTS

WO    WO 99/05618    2/1999

(Continued)

OTHER PUBLICATIONS

U.S. Appl. No. 11/341,788, filed Jan. 27, 2006, Segond, et al.

(Continued)

*Primary Examiner*—Huyen X. Vo
(74) *Attorney, Agent, or Firm*—Fay Sharpe LLP

(57) ABSTRACT

A method for troubleshooting a problem with a device includes acquiring device data for the device, receiving a user's query concerning a device in a natural language, presenting possible refinements to at least a portion of the user's query for defining a problem statement, presenting candidate solutions that are associated with the defined problem statement in a knowledge base, at least one of the presentation of possible refinements and the presentation of candidate solutions being informed by device data that is linked through a diagnostic model of the device to at least one of the problem statements and candidate solutions.

23 Claims, 6 Drawing Sheets

U.S. PATENT DOCUMENTS

| | | |
|---|---|---|
| 2004/0073403 A1 | 4/2004 | Hart et al. |
| 2004/0125403 A1 | 7/2004 | Furst et al. |
| 2005/0050182 A1 | 3/2005 | Neville et al. |
| 2005/0137847 A1 | 6/2005 | Brun et al. |
| 2005/0138000 A1 | 6/2005 | Roux et al. |
| 2005/0138556 A1 | 6/2005 | Brun et al. |
| 2005/0172018 A1 | 8/2005 | Devine et al. |
| 2005/0172170 A1 | 8/2005 | Thieret et al. |
| 2005/0267871 A1 | 12/2005 | Marchisio et al. |
| 2006/0248178 A1 | 11/2006 | Thieret |

FOREIGN PATENT DOCUMENTS

| | | |
|---|---|---|
| WO | WO 2004/114163 A2 | 12/2004 |

OTHER PUBLICATIONS

U.S. Appl. No. 11/354,688, filed Feb. 15, 2006, Roulland, et al.
U.S. Appl. No. 11/425,277, filed Jun. 20, 2006, Thieret, et al.
U.S. Appl. No. 11/444,706, filed Jun. 1, 2006, Bonikowski.
U.S. Appl. No. 11/522,171, filed Sep. 15, 2006, Sampath, et al.
U.S. Appl. No. 11/544,200, filed Oct. 6, 2006, Roulland, et al.
Aït-Mokhtar, *Incremental Finite-State Parsing*, Proceedings of Applied Natural Language Processing, Washington, Apr. 1997.
Aït-Mokhtar, *Subject and Object Dependency Extraction Using Finite-State Transducers*, Proceedings ACL'97 Workshop on Information Extraction and the Building of Lexical Semantic Resources for NLP Applications, Madrid, Jul. 1997.
Aït-Mokhtar, *Robustness Beyond Shallowness: Incremental Dependency Parsing*, NLE Journal, 2002.
Aït-Mokhtar, *A Multi-Input Dual-Entry Dependency Parser*, Proceedings of Beijing, IWPT, 2001.
J.O'Neill, P.Tolmie, S.Castellani, A.Grasso, *The Practical Indispensability of Articulation Work to Immediate Remote Help-Giving*, Articulation-Work-CSCW, Banff, Alberta, Canada, Nov. 4-8, 2006.
F.Roulland, A.Kaplan, S.Castellani, C.Roux, A.Grasso, K.Petterson, J. O'Neill, *Query Reformation and Refinement Using NLP-Based Sentence Clustering*, The 29th European Conference on Information Retrieval (ECIR), (Abstract), Rome, Italy, Apr. 2-5, 2007.
N.Lao, J.R.Wen, W.Y.Ma, Y.M.Wang, *Combining High Level Symptom Descriptions and Low Level State Information for Configuration Fault Diagnosis*, 18th Large Installation System Administration Conference, pp. 151-158, Atlanta, GA, Nov. 14-19, 2004.
Y.M.Wang, C.Verbowski, J.Dunagan, Y.Chen,H.J.Wang, C.Yuan, Z.Zhang, *Strider: A Black-Box, State-Based Approach to Change and Configuration Management and Support*, Proceedings of the 17th Large Installation Systems Administration Conference, USENIX, San Diego, CA, Oct. 26-31, 2003.
P.E.Hart, J.Graham, *Query-Free Information Retrieval*, Ricoh California Research Center.
J.O'Neill, A.Grasso, S.Castellani, P.Tolmie, *Using Real-Life Troubleshooting Interactions to Inform Self-Assistance Design*, Proceedings of Interact, Rome, Italy, Sep. 12-17, 2005.
http://h20219.www2.hp.com/services/cache/10707-0-0-225-121.html.
http://www.phasersmart.com/overview.html.
L.Alamarguy, R.Dieng-Kuntz, C.Faron-Zucker, *Extraction of Lexico-Syntactic Information and Acquisition of Causality Schemas for Text Annotation*, Internet XP019015649, pp. 1180-1186, 2005.
Aït-Mokhtar S., Hagege C., Sandor A., *Problemes D'Intersubjectivite dans L'Evaluation des Analyseurs Syntaxiques*, TALN Conference, Batz-sur-mer, France, Jun. 11-14, 2003.
James Allan, *Relevance Feedback with Too Much Data*, Proceedings of the 18th Annual Intl. ACM SIGIR Conference on Research and Development in Information Retrieval, 1995.
Robert C. Berwick, *Parsing by Chunks*, Principle-Based Parsing Computation and Psycholinguistics, pp. 257-278, Kluwer Academic Publishers, Boston, 1991.
David W. Aha, *Supporting Dialogue Inferencina in Conversational Case-Based Reasoning*, Proceedings of EWCBR, 1998.
J.Oneill, A.Grasso, S.Castellani, P.Tolmie, *Using Real-Life Troubleshooting Intaractions to Inform Self-Assistance Design*, IFIP Conference on Human-Computer Interaction, 2005.
U.S. Appl. No. 11/013,366, filed Dec. 15, 2004, Brun, et al.
U.S. Appl. No. 11/018,758, filed Dec. 15, 2004, Brun, et al.
U.S. Appl. No. 11/018,892, filed Dec. 21, 2004, Brun, et al.
U.S. Appl. No. 11/173,136, filed Dec. 20, 2004, Sandor, et al.
U.S. Appl. No. 11/173,680, filed Dec. 20, 2004, Sandor, et al.
U.S. Appl. No. 11/187,170, filed Nov. 23, 2005, Brun, et al.
U.S. Appl. No. 11/202,549, filed Aug. 12, 2005, Brun.
D. Carmel, *Automatic Query Refinement Using Lexical Affinities with Maximal Information Gain*, Proceedings of the 25th Annual International ACM SIGIR Conference on Research and Development in Information Retrieval, 2002.
Kalyan Gupta, *A Framework for Incremental Query Formulation in Mixed-Initiative Case-Based Reasoning*, Proceedings of ICCBR Mixed-Initiative Case-Based Reasoning Workshop, 2003.
Fredrik V. Jensen, *The SACSO System for Troubleshooting of Printing Systems*, Proceedings of SCAI, pp. 67-79, 2001.
Y. Jing, *An Association Thesaurus for Information Retrieval*, Proceedings of RIAO, 1994.
Byeong H. Kang, *Help Desk System with Intelligent Interface*, Applied Artificial Intelligence, vol. 11, No. 7, pp. 611-631(21), Dec. 1, 1997.
Reiner Kraft, *Mining Anchor Text for Query Refinement*, Proceedings of the 13th International World Wide Web Conference, 2004.
From Factoids to Facts, *The Economist*, pp. 68-69, Aug. 28, 2004.
Alcouffe P., Gacon N., Roux C., Segond F., *A Step Toward Semantic Indexing of an Encyclopedic Corpus*, Proceedings of LREC, Athens, Jul. 2000.
http://www.inxight.com.pdfs/FactExtraction_Web.pdf.
Brun C. & Segond F., *Semantic Encoding of Electronic Documents*, vol. 6 No. 1 of the International Journal of Corpus Linguistics, 2001.
Brun C. & Hagege C., *Intertwining Deep Syntactic Processing and Named Entity Detection*, ESTAL 2004, Alicante, Spain, Oct. 20-22, 2004.
Brun C. & Hagege C., *Normalization and Paraphrasing Using Symbolic Methods*, ACL, Second International Workshop on Paraphrasing, Paraphrase Acquisition and Applications, Sapporo, Japan, Jul. 7-12, 2003.
Hagege C. & Roux C., *Entre Syntaxe et Semantigue: Normalisation de la Sortie de L'Analyse Syntaxigue en vue de L'Amelioration de L'Extraction D'Information a Partir de Textes*, TALN, Batz-sur-mer, France, Jun. 11-14, 2003.
Hull D., Ait-Mokhtar S., Chuat M., Eisele A., Gaussier E., Grefenstette G., Isabelle P., Samuelsson C. & Segond F., *Language Technologies and Patent Search and Classification*, World Patent Information 23, pp. 265-268, 2001.
Jacquemin B., Brun C. & Roux C., *Enriching a Text by Semantic Disambiguation for Information Extraction*, Conference Proceedings LREC, Las Palmas, Spain, Jun. 2, 2002.
Kaplan A., *Towards a Consistent Logical Framework for Ontological Analysis*, Proceedings of the International Conference on Formal Ontology in Information Systems, Ogunquit, Maine, Oct. 2001.
Richardson S., *Determining Similarity and Inferring Relations in a Lexical Knowledge Base*, PhD. Dissertation, City University of New York, 1997.
Segond F., Schiller A., Grefenstette G. & Chanod J.P., *An Experiment in Semantic Tagging Using Hidden Markov Model Tagging*, ACL-EACL Workshop about Lexical Semantics, Madrid, 1977.

\* cited by examiner

INFORMING TROUBLESHOOTING SESSIONS WITH DEVICE DATA

CROSS REFERENCE TO RELATED PATENTS AND APPLICATIONS

The following copending applications, the disclosures of which are incorporated herein in their entireties by reference, are mentioned:

U.S. application Ser. No. 11/544,200, filed Oct. 6, 2006, entitled NAVIGATION SYSTEM FOR MANUALS, by Frederic Roulland, et al.;

application Ser. No. 11/354,688, filed Feb. 15, 2006, entitled NATURAL LANGUAGE PROCESSING FOR DEVELOPING QUERIES, by Frederic Roulland, et al.;

application Ser. No. 11/341,788, filed Jan. 27, 2006, entitled LINGUISTIC USER INTERFACE, by Frederique Segond, et al.;

application Ser. No. 11/425,277, filed Jun. 20, 2006, entitled AUTOMATED REPAIR ANALYSIS USING A BUNDLED RULE-BASED SYSTEM, by Tracy Thieret, et al.;

application Ser. No. 11/444,706, filed Jun. 1, 2006, entitled GENERATION AND PRINTING OF A CUSTOMIZED MAINTENANCE MANUAL UTILIZING CURRENT MACHINE STATUS, by Gregg A. Bonikowski; and application Ser. No. 11/522,171 filed Sep. 15, 2006, entitled FAULT MANAGEMENT FOR A PRINTING SYSTEM, by Meera Sampath, et al.

BACKGROUND

The exemplary embodiment relates to the linguistic processing arts. It finds particular application in conjunction with troubleshooting of faults with electromechanical devices by searching a structured knowledge base, such as a manual, and enhancing the search results by querying the electromechanical device in which the fault has been observed, and will be described with particular reference thereto. However, it is to be appreciated that it is also amenable to other like applications.

Many of the devices used today, both within the workplace and outside it, are highly complex. Such devices include electromechanical devices, such as computing devices, such as personal computers, image reproduction devices, such as printers and photocopiers, vehicles, and audio and visual equipment, such as cameras, video recorders, cell phones, dictation devices, music systems, and the like. As computing power has increased, so the functionality of these devices has also increased. The added functionality is wasted, however, if users do not know how to use or maintain the device or are unable to locate the necessary information to do so.

When a customer observes a problem with an electromechanical device, it is advantageous for the customer to determine how to repair the device without requiring a visit from a service engineer. The customer may therefore try to troubleshoot the machine problem, for example, by following instructions on the machine, by searching for solutions in online resources, or by contacting the manufacturer's help line (e.g., by phone or email). The troubleshooting process generally requires the user to articulate the symptoms of the problem so that the likely solutions can be retrieved from the resource. This is often difficult, since the user may be unfamiliar with the terminology used in the resource provided. As a consequence, where multiple devices are available, the user may abandon the faulty device and find another, leaving the problem for the next user to solve. This is particularly true when the problem is a non-fatal compromise of performance and it is not readily searchable. Here the user is faced with identifying the appropriate {symptom, cause, solution} triplet from a large set of problems identified by the search engine without much assistance in the process. This leads to user frustration and abandonment of the troubleshooting process, resulting in an expensive service visit for remediation and a period in which the device is performing suboptimally. An efficient, live, computationally mediated assistance is thus a more satisfactory answer to the customer's problem.

REFERENCES

The following references, the disclosures of which are incorporated herein in their entireties, are mentioned:

U.S. Pub. No. 20030110413, published Jun. 12, 2003, entitled METHOD FOR ANALYZING PRINTER FAULTS, by Bernklau-Halvor, discloses a method of diagnosing a printer problem which includes correlating a wide range of printer data types with suggested solutions. Printer diagnostic data, which may include usage information and printer status information collected over a period of time, is parsed into individual components. The components are then input into a set of rules. Each rule compares each component with a corresponding reference value to generate a comparison result, correlates the comparison result with a set of actions including solutions, and if there is a correlation between the comparison result and a solution, providing the solution.

U.S. Pub. No. 20030110412, published Jun. 12, 2003, entitled SYSTEM AND METHOD FOR AUTOMATED PRINTER DIAGNOSTICS, by Neville, discloses a support system for diagnosing printer problems, includes a support server and a printer located remote from the support server. The support server includes a rules engine for parsing printer diagnostic data into components, for analyzing the components and for generating a suggested solution based on combinations of printer diagnostic data and error conditions.

U.S. Pub. No. 20050050182, published Mar. 3, 2005, entitled PERIPHERAL DEVICE DIAGNOSTIC METHOD AND ARCHITECTURE, by Neville, et al. discloses a method for performing diagnostics on a computer peripheral device having a web server, such as a printer. The device is coupled to a computer having a web browser. The method includes coupling the computer to a backend server via a communication link and constructing and sending a peripheral device HTTP message to the web browser via the peripheral device.

U.S. Pub. No. 20050172170, published Aug. 4, 2005, entitled APPLICATION OF LIVE MACHINE DATA TO CUSTOMER SUPPORT FAULT ISOLATION PROCESSES, by Thieret, et al., discloses methods and systems where remotely accessible machine-provided data is provided to a customer support enterprise system such as a telephone help desk, wherein the data automatically satisfies a need for most information traditionally provided for analysis manually during a conversation.

U.S. Pub. No. 20060248178, published Nov. 2, 2006, entitled System and Method for Applying Computational Knowledge to DEVICE DATA, by Thieret, discloses a system and method for acquiring and processing device usage data and applying a computational knowledge thereto for proactively determining customer state, including inferring device usage patterns, and accordingly proposing at least one action, if any, to be undertaken.

U.S. Pat. No. 7,058,567, issued Jun. 6, 2006, entitled NATURAL LANGUAGE PARSER, by Aït-Mokhtar, et al., discloses a parser for syntactically analyzing an input string of text. The parser applies a plurality of rules which describe syntactic properties of the language of the input string.

BRIEF DESCRIPTION

In accordance with one aspect of the exemplary embodiment, a method for troubleshooting a problem with a device includes acquiring device data for the device, receiving a user's query concerning a device in a natural language, presenting possible refinements to at least a portion of the user's query for defining a problem statement, presenting candidate solutions that are associated with the defined problem statement in a knowledge base, at least one of the presentation of possible refinements and the presentation of candidate solutions being informed by device data that is linked through a diagnostic model of the device to at least one of the problem statements and candidate solutions.

In accordance with another aspect of the exemplary embodiment, a system for troubleshooting a problem with a device includes a device data acquisition module which acquires device data for the device. A text searching module receives a user's query concerning a device in a natural language, generates possible refinements to at least a portion of the user's query for defining a problem statement, and retrieves candidate solutions that are associated with the defined problem statement in an associated knowledge base. An integration module integrates device data which is linked in a model of the device with at least one of the possible refinements and candidate solutions for informing the presentation of the possible refinements and presented candidate solutions.

In accordance with another aspect of the exemplary embodiment, a graphical user interface is configured for displaying a web browser in which a user submits a query relating to a problem with a device. The user interface is further configured for presenting possible refinements to at least a portion of the query for defining a problem statement relating to a problem with device and for presenting candidate solutions to the problem retrieved from an associated knowledge base, at least one of the presentation of possible refinements and presentation of candidate solutions being informed by device data for the device.

In another aspect, a method for generating a model for informing results of a troubleshooting search with device data includes defining an ontology of a device or class of devices to which the device belongs, the ontology having a tree structure in which nodes of the structure define concepts. Cases in a knowledge base relating to defined problems with the device are linked to selected ones of the nodes, enabling device data relating to a concept to be linked to cases in the knowledge base that are linked to that concept.

DETAILED DESCRIPTION

Figure 1:
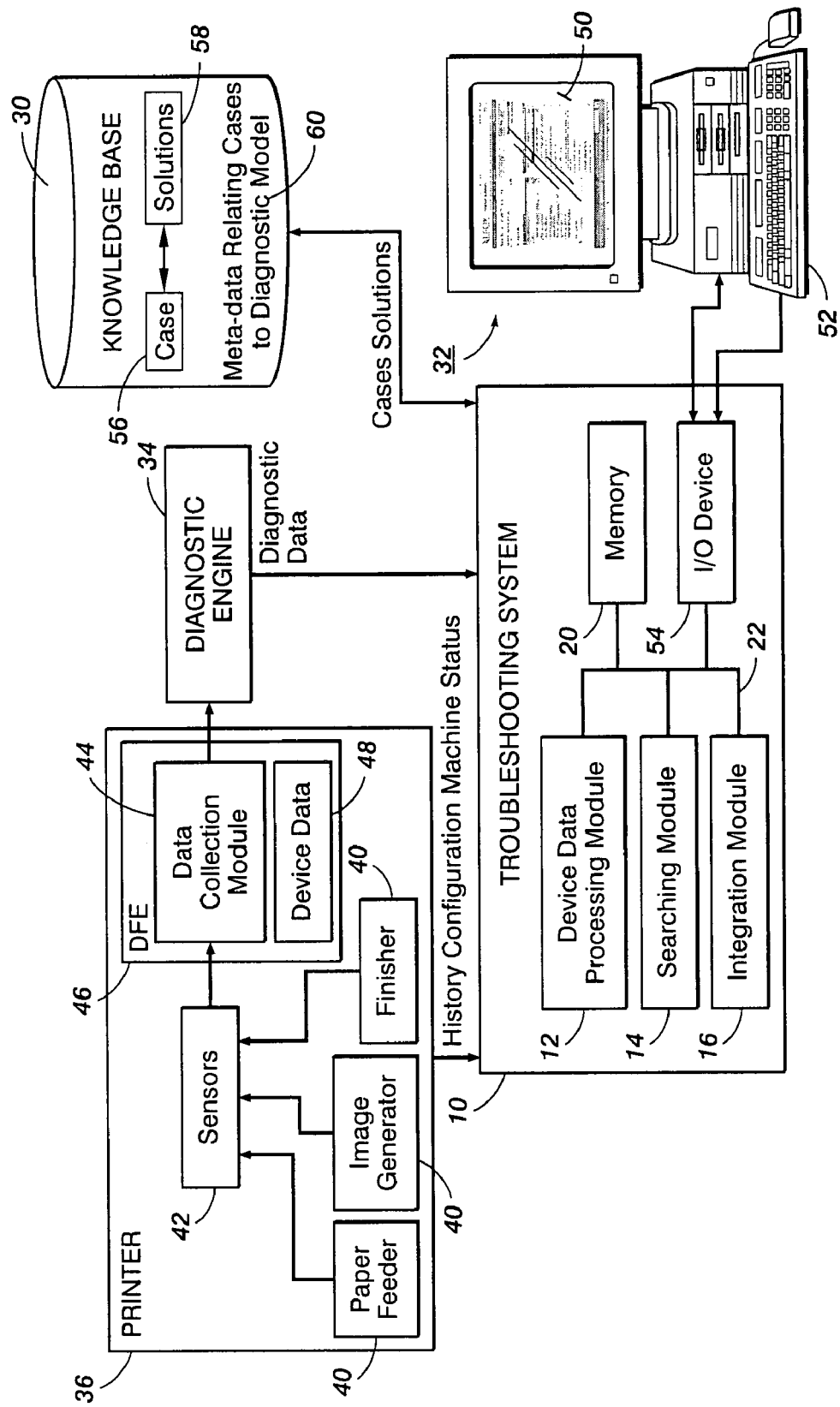
FIG. 1 is a functional block diagram of an environment in which a troubleshooting system operates in accordance with one aspect of the exemplary embodiment.

Aspects of the exemplary embodiment relate to a troubleshooting system, to a user interface for troubleshooting problems with an electromechanical device by navigating a knowledge base, to a method for troubleshooting problems with a device, and to a method for developing a troubleshooting system.

The exemplary system and method provide improvements in a typical web-based support system consisting of a searchable troubleshooting knowledge base, such as an on-line manual, by informing search sessions with device data. This allows a user to find solutions more easily that are related to the actual machine and the actual problem the user is experiencing with the machine. In various aspects, the method includes identifying solutions, within the space of solutions resulting from the textual search of the user, that are particularly likely to be relevant, given the data coming from the machine, and giving these solutions higher visibility.

While the term "user" will be used in the disclosure below, "user" will include reference to any person or persons, such as office managers, office employees, solo business owners, customers, home owners, and the like, all of which may be used interchangeably to represent any individual interacting with a device.

The terms "device," "machine," and "marking device" are used interchangeably herein and encompass any electromechanical device or system capable of being included on a computer network. Such devices may include, but are not limited to printers, copiers, scanners, fax machines, multifunctional devices, network routers, network switches, network computational devices including servers and workstations, network file systems and the like, household appliances such as heating and cooling systems, refrigerators, washing and drying machines, and the like.

Above-mentioned application Ser. Nos. 11/544,200 and 11/354,688 by Roulland, et al., incorporated by reference, disclose systems and methods for accessing the content of a manual for troubleshooting problems associated with a device, such as a printer. The system includes a user interface which allows a user to input a query in a natural language and to refine the query to generate a problem statement by selecting from proposed refinements to the initial query which are developed by natural language processing (NLP) techniques. Likely solutions are displayed when the user selects a refined problem statement. Where multiple solutions are retrieved, the user may be instructed to attempt each solution in turn until the problem is resolved. In the present application, a user interface, such as that of Ser. Nos. 11/544,200 and 11/354,688, may be employed to develop a problem statement for retrieving one or more corresponding cases and their associated solutions from a knowledge base, although it is also contemplated that other techniques for generating a problem statement capable of being used by a search engine for retrieving solutions may be employed.

In the exemplary embodiment, device data representing information on the current configuration, state, and history of a device, such as a printer, are used to help the inquirer of a troubleshooting knowledge base in arriving at a solution much more rapidly than may be achieved with a verbal expression of the user's perception of the problem alone. The exemplary interface and method allow merging of an understanding of the user's statement of the perception of the problem with the device data. This union of user text and device data, in many situations, converges to a solution faster than with the customer's articulation alone.

The exemplary embodiment thus provides a computationally mediated method for informing troubleshooting search sessions with device configuration and state data in order to assist the user in finding solutions that are related to the actual problem the user is experiencing with the device in "real-time" at the time of the support session. In general, the method includes accepting a short problem statement from the user describing the problem, generating a set of possible matches in the knowledge base, prioritizing those matches from information gathered from the device, and iterating until a small set of likely candidates is identified. The user is then encouraged to perform the recommended remediatory action(s). This integration of device data and user articulation of a problem assists the user in the process of progressively expressing a problem with a device and identifying the appropriate solution to it. It is the real-time confluence of the textual information with the device configuration/state data that makes the convergence to a solution of the device problem occur more quickly than with the textual information alone. This convergence may often occur in a single step, thus increasing the user's confidence in the solution proffered and reducing the time and frustration of multiple unsuccessful iterations.

In various aspects, text search data is integrated with information on device history, status, configuration, and diagnostic results for better troubleshooting support. In particular, the method includes integrating, within a representation of the solution space of a search system, one or more of the following kinds of information:

1. Configuration data. The information on the configuration of the device may include information on optional components which are present on some but not all of the devices for which the knowledge base has been developed. Additionally, the configuration information may include information on device settings.

2. Diagnostic data. This may include information obtained from sensors on the device and by automated tests performed by the device. It is known for devices, such as printers, to include processing components for troubleshooting problems detected on the device. The processing components may initiate test prints or other operations of the device which generate device data which can be used in automated troubleshooting of the device. The device diagnostic data, however, may be insufficient, on its own, for the device to identify the cause of the problem. This information may be used by the exemplary system for giving higher success likelihood to cases/solutions that are compatible with the problem(s) that the device and analysis system has already detected. For example, cases/solutions which are compatible with device diagnosis may be flagged as such and/or ranked more highly.

3. Device history and current status data. The device may monitor a variety of parameters on a continuous or semi-continuous basis which may be used to provide information on the device current status and to provide a history of the device status over time, such as over the course of a day or several days. This information may be used for acknowledging parts of solutions already performed. For example, the device data may indicate that a user has already attempted some or all of the remediation steps associated with a particular solution, in which case, this information may be presented to the user.

All of these types of data will be referred to as device data. The device data is specific to the particular device which has a problem that the user is trying to troubleshoot.

Following the analysis of the user's text and the returned analysis of the device information, the candidate solutions may be presented to the customer in the order most likely to succeed. Solutions deemed by the analysis to have higher likelihood of success are given more visibility than those with lower prospects of success.

FIG. 1 illustrates a functional block diagram of an environment in which an exemplary troubleshooting system 10 operates. The troubleshooting system 10 executes instructions for receiving device data and user queries and for retrieving problem statements and solutions in accordance with stored algorithms and/or based on user-selected functions and may be embodied in a personal/office computing system or a device, such as a printer, or the like, or elsewhere, such as on a server. The illustrated system 10 includes various modules 12, 14, 16, for accessing, collecting and processing device data, for text searching, and for incorporating device data into troubleshooting results. The various processing modules 12, 14, 16, may access a memory 20, in which device data is stored during processing as well as queries input by a user and information retrieved from in response to the queries. The components of the troubleshooting system 10 may all be interconnected by a bus 22.

The illustrated troubleshooting system 10 communicates with a knowledge base 30 and is operatively connected with a user interface 32. The system also communicates with one or more sources of device data, here illustrated as a diagnostic engine 34 and a device, such as printer 36. The troubleshooting system 10, knowledge base 30, diagnostic engine 34 and device 36 may communicate via wired or wireless links, such as a computer network, e.g., a local area network (LAN) or wide area network (WAN), or the Internet.

The device 36 may be a printer, copier, scanner, fax machine, multifunctional device, home appliance, or any other electromechanical device that is connected to a communications network and which has electrical or mechanical parts that may require repair. The exemplary device 36 includes a number of operating components 40 which, from time to time, may contribute, individually, or in combination, to faults in the operation of the device. These faults may be observed as problems by an operator using the device. In the case of a printer, for example, the components 40 typically include one or more paper feeders, an image applying component, which applies colorants such as inks or tones to the paper or other print media substrate to form an image thereon, optionally a fusing system for fixing the image more permanently to the substrate, a finisher, and a conveyor system which conveys print media from the feeder to the other components in turn. Sensors 42 within or associated with the device 36 collect device data from the components 40. The sensors 42 may be real or virtual sensors and collect a variety of types of low level device data. For example, in the case of a printer, sensors 42 may detect opening and closing of doors and trays, counts of prints being made over time, electrical data, such as operating voltages of the components, image data, such as image quality and color, and the like. The device 36 may further include one or more device data collection modules 44, which may be resident in the printer's computer 46, generally referred to as the Digital Front End (DFE). The sensors 42 may send the sensed device data to the collection module 44 associated with the respective component or to a common collection module. The collection module 44 sends some or all of the device data, optionally after processing, to the diagnostic engine 34.

The device 36 may further provide one or more of the following forms of device data 48 directly to the troubleshooting system 10: historical data, device status data, and configuration data. The device data 48 may be stored in memory in the DFE. In particular, historical and device status data provided may include information on operations typically associated with maintenance or repair of the device, such as the manipulations of mechanical parts, (e.g. opened/closed valves, access panels, doors, or trays); functions recently used; and recent maintenance/troubleshooting operations. Configuration data provided may include the optional components currently on the device and their current state.

The diagnostic engine 34 provides diagnostic data to the system 10. In particular, the diagnostic engine 34 receives the low level device data collected by the device 36, analyses the collected device data, and may output one or more diagnoses. Each diagnosis may identify one or more components of the device as contributing to a fault in the device, optionally with a probability assessment, based on a historical likelihood that the diagnosis is correct. The diagnostic engine may take the form of a rule-based system. A rule may be triggered by a predefined set of low level device data and a diagnosis may be based on the rule or rules triggered. The rules may be defined by experts in the field and/or may be based on data mining techniques.

The diagnostic engine 34 may be resident on the device 36 and/or may be remote from the device and in communication therewith. For example, the diagnostic engine may be located on a server or other computing device in communication with the printer via a network, such as a local area network or the Internet. Exemplary diagnostic servers which may be used as a basis for the diagnostic engine 34 are described, for example, in application Ser. Nos. 11/425,277; 11/522,171 and in U.S. Pat. No. 5,923,834, the disclosures of which are incorporated herein by reference in their entireties. A suitable example of a system and method for communication between electronic devices in a distributed network is described in U.S. Pat. No. 6,892,317, the disclosure of which is incorporated herein by reference in its entirety.

The illustrated user interface 32 may be a graphical user interface (GUI) and may include a display 50, such as a screen, and a user input device 52, such as a touch screen, keyboard, keypad, cursor control device, such as a mouse, track ball, pen, touch pad, or a touch screen, stylus, or combination thereof. The user interface may interact with the troubleshooting system 10 via a web browser displayed on the display 50.

The display 50 displays responses to the user's query and may display options for developing the query to more closely match problem statements in the knowledge base. In one embodiment, a navigation tree is used for developing the query, as disclosed, for example, in application Ser. No. 11/544,200. A user interacts with the user interface 32 by manipulation of the associated user input device 52. A user can enter a query as a text string as well as navigate the screens and other features of the graphical user interface, such as one or more of a toolbar, pop-up windows, scrollbars (a graphical slider that can be set to horizontal or vertical positions along its length), menu bars (a list of options, which may be used to initiate actions presented in a horizontal list), drop down menus (a list of options that can be used to present menu sub-options), and other features typically associated with web browsers. The user interface inputs queries to the troubleshooting system 10 via a suitable input/output device 54. As will be appreciated, the user interface may include separate processing capability which is compatible with that of the troubleshooting system 10.

The memory 20 may represent any type of computer readable medium such as random access memory (RAM), read only memory (ROM), magnetic disk or tape, optical disk, flash memory, or holographic memory. In one embodiment, the memory 20 comprises a combination of random access memory and read only memory.

While the exemplary embodiment has been described in terms of a troubleshooting system 10, a knowledge base 30 and a user interface 32 as separate components remote from each other, it is also contemplated that two or more of these components may be incorporated into a single device. In one embodiment, the user interface 32 and/or troubleshooting system 10 may form a part of the device 36 or may be embodied in a separate computing device or devices. For example, the troubleshooting system 10 may operate on a server and the user interface 32 can be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a workstation of a computer network or other computer device such as a personal computer or mobile computer device, such as a PDA, a cell phone, a Tablet PC, a Pocket PC, or other suitable electronic device.

The knowledge base 30 may be in the form of a relational database. Alternatively, the problem statements may be stored as hypertext documents, such as extensible markup language (XML) documents, which are annotated with tags, which link the problem descriptions to the associated solutions and concepts.

The illustrated knowledge base 30, which may be stored in memory on the server, includes an annotated set of text strings which may be retrieved as responsive to a user's query. In particular, the text strings in the knowledge base 30 take the form of defined cases 56, each of which describes a potential problem with the device 36. Each problem 56 is associated, in the knowledge base, with a set of solutions 58 that can potentially fix the problem. The problem descriptions describe problems known to be associated with the family of devices to which the device 36 belongs, expressed in natural language. A defined problem description can be a short textual description of a problem that users may experience, e.g., a known problem with a device. For example, it could be the single sentence which describes a problem. In the case of a printer for example, an exemplary problem description may be "White lines when making copies from the document glass and document feeder." The set of defined solution sequences 58 are also expressed in natural language. The solution sequences each comprise a sequence of one or more steps for a user to perform in attempting to solve the problem. A solution sequence may be composed of at least two parts: a title, which basically describes what needs to be done, and a description, which gives step by step instructions to the user to fix the problem. Since a problem identified by a user may have more than one possible root cause, cases in the knowledge base 30 may include more than one solution sequence. Additionally, two or more problem statements may be associated with the same solution. The knowledge base may be indexed according to the normalized forms of the words that occur in the problem descriptions, and optionally also the solutions, or parts thereof, and their synonyms, as well as syntactic units that they contain. As further described in application Ser. Nos. 11/544,200 and 11/354,688, each syntactic unit may be a linguistically coherent expression which is a sequence of words in the same sentence which are grammatically related, such as a noun phrase, a prepositional phrase, or the like.

In addition to the problems and solutions, meta-information 60 is also present in the knowledge base 30. The meta data 60 links the knowledge base text to a model which provides an ontology of the device 36 or class of devices to which the knowledge base is applicable. An example of such a model 62 is given in FIGS. 2 and 3. In generating the ontology, a list of concepts is defined in order to group the problems into classes. For example, a concept defining a mechanical part of the device, such as finisher, can group together all the problems related to this part. In another embodiment, a concept may define a logical category of problems, such as 'image quality' or 'jam' for a printer. These concepts can also be organized hierarchically in order to have super-classes of cases.

Figure 2:
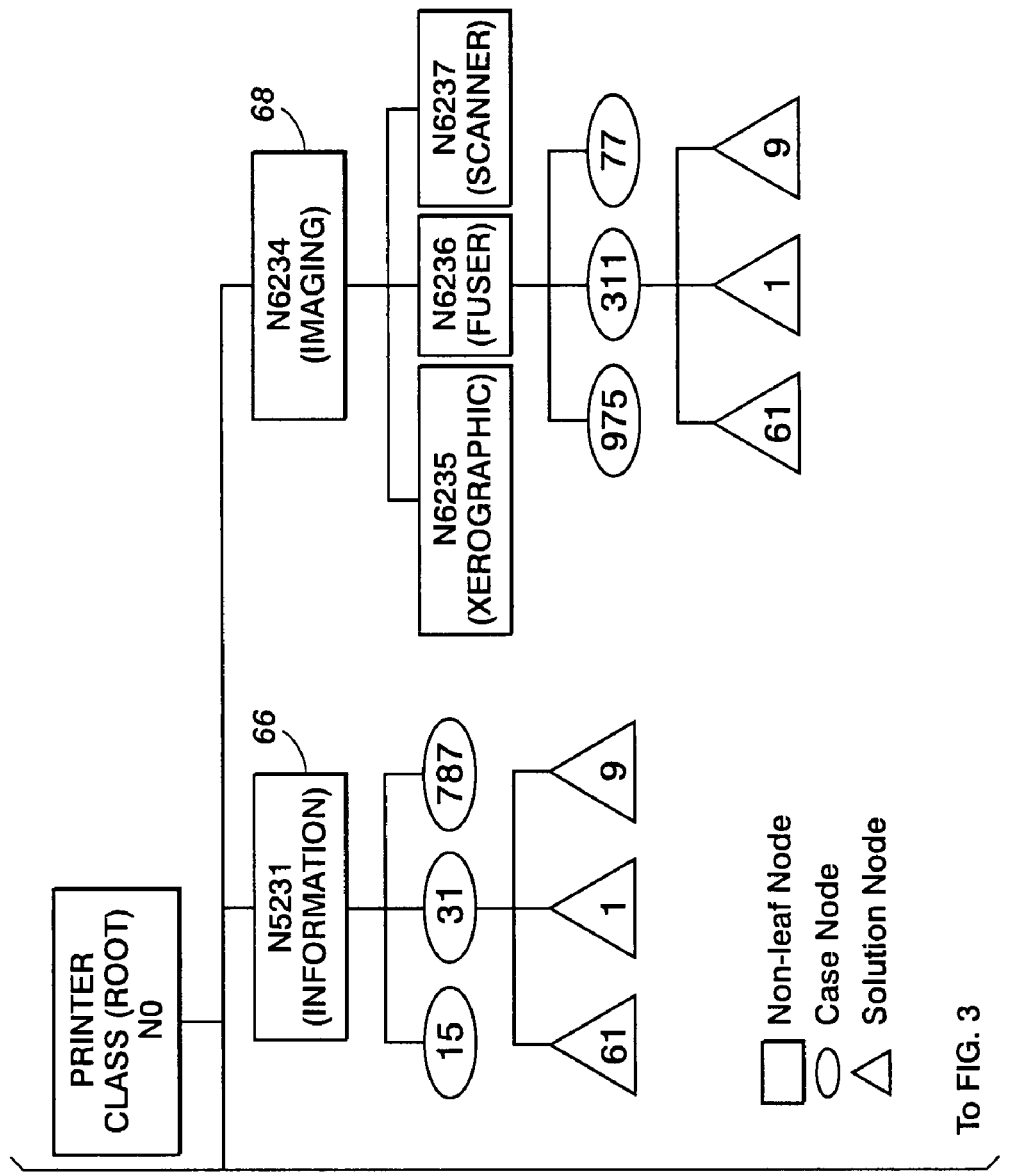
FIGS. 2 and 3 illustrate a diagnostic model with a hierarchical structure of classification.

FIG. 2 shows an example of such a model 62 for the case of printers which include electrophotographic marking engines but is conceptually general for any electromechanical device composed of recursively identifiable subunits. The model 62 has a hierarchical structure, which shows the relationship between concepts. The structure may be in the form of a diagnostic tree, as illustrated, in which nodes are linked to each other. A tree is a graph in which any two points are connected by exactly one path, and is a widely-used computer data structure that emulates a tree structure with sets of linked nodes. Nodes are similar to the branches of a tree, and may have zero or more child nodes. A node that has a child is called the child's parent node. A child has at most one parent; a node without a parent is called the root node (or root). Nodes with no children are called leaf nodes.

Figure 3:
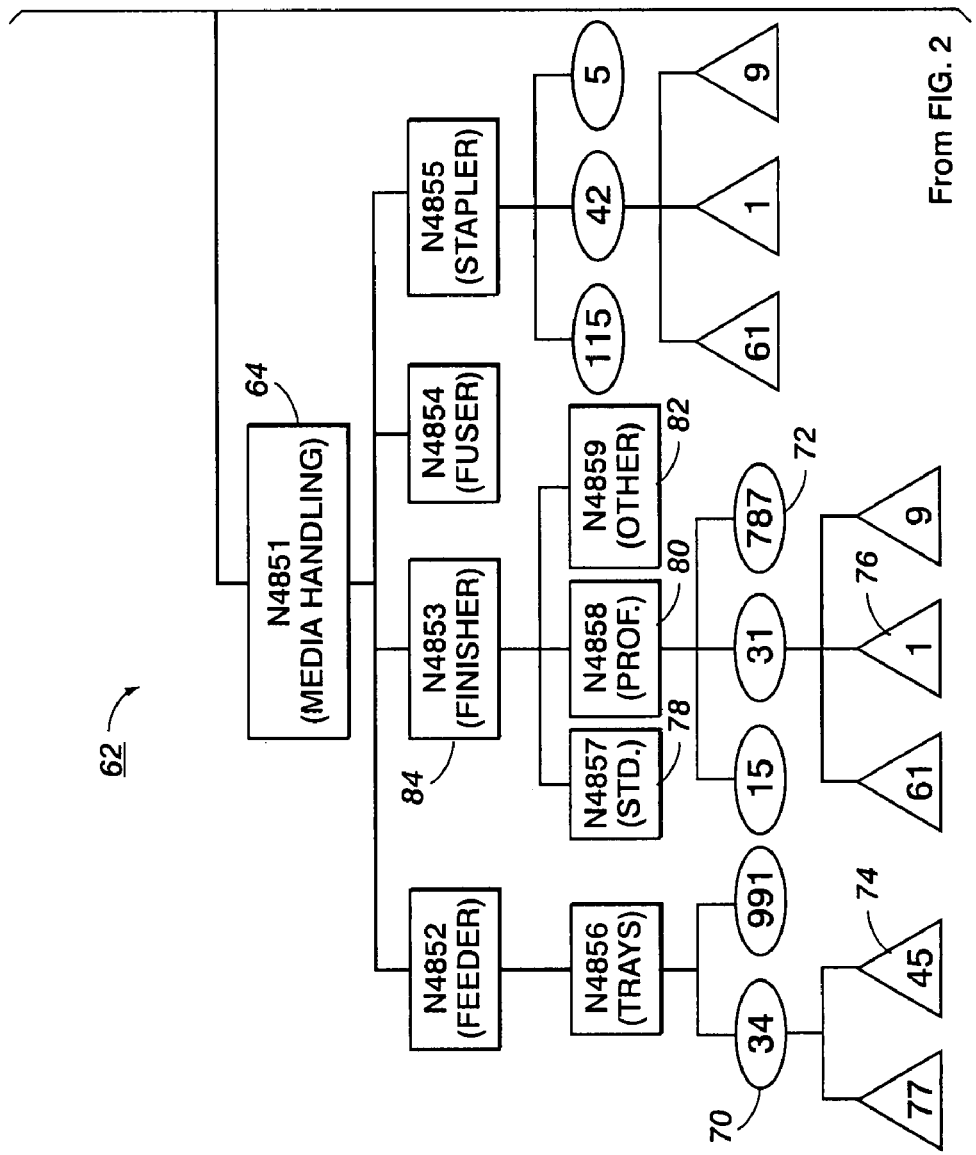

For example, in the illustrated diagnostic model 62, a class of upper level concept nodes 64, 66, 68 have been defined which relate to media handling, information, and imaging. Each of these concept nodes is linked, either directly or indirectly, to one or more case nodes, such as nodes 70, 72. In turn, the case nodes 70, 72 are each linked to one or more solution nodes, such as nodes 74 and 76. Each solution in the knowledge base may thus be represented in the tree by a solution node which is linked to its respective problem node. The problem nodes in turn are linked to concept nodes. In some cases a group of concepts may be linked to a higher order concept node, and so forth. Some of the concept nodes may represent alternatives which are present in some but not all printers in a class. For example concept nodes 78, 80, 82 are linked to a higher node 84 which relates to all finishers, which is linked in turn to the node 64 for media handling. Nodes 78, 80, 82 represent three different types of finisher (standard, professional, and other), only one of which may be present in a particular device 36 at any time. As will be appreciated, only a portion of the nodes of exemplary diagnostic tree 62 are shown in FIGS. 2 and 3, with many concept nodes, case nodes, and solution nodes being omitted for clarity.

The meta-information 60 associated with the knowledge base 30 links each case/solution to the particular node of the diagnostic model 62 to which it relates. For example, cases/solutions which relate only to the professional finisher are linked to node 80 of the structure 62 while cases/solutions which relate to all types of finisher are linked to node 84 and thus are automatically linked to child nodes 78, 80, 82.

The troubleshooting system 10 includes a device data processing module 12 which accesses the sources of device data 34, 36. For example, the processing module 12 may query the device 36 and diagnostic engine periodically and/or may query these components when a user enters a query. The collected device data from devices 34, 36 is stored in memory 20. The processing module 12 may process the device data to link the data with appropriate nodes of the tree structure in model 62. A search module 14 receives user queries from the user input device and generates queries therefrom in a suitable language for querying the knowledge base 30 and retrieving responses therefrom. The search module 14 may be configured similarly to that described in application Ser. No. 11/544,200, incorporated by reference. The integration module 16 integrates the device data with the search results output by the text searching module 14, such that the device data informs the output search results, as described in greater detail below with reference to FIG. 6.

Figure 4:
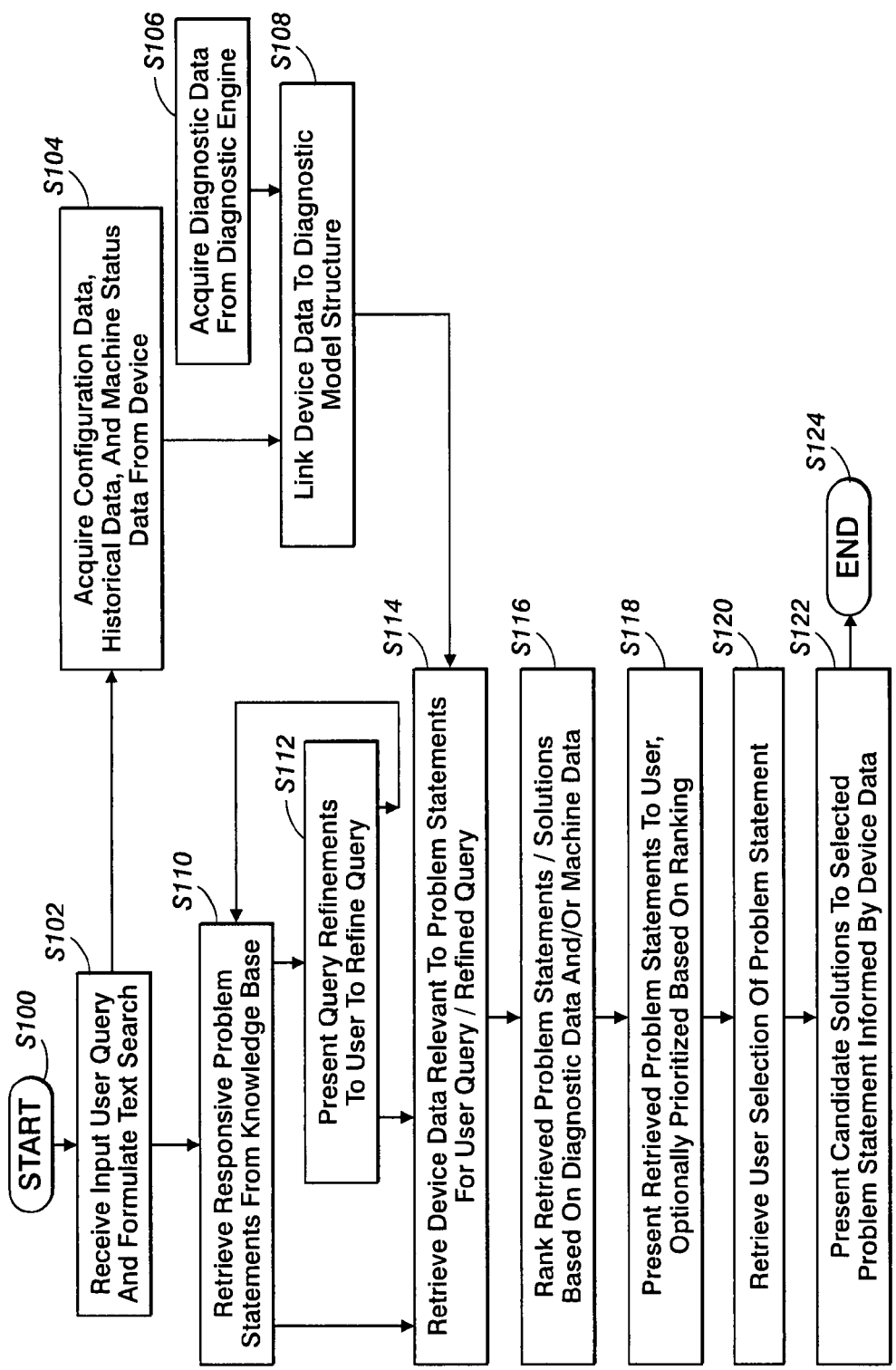
FIG. 4 illustrates a method for troubleshooting in accordance with another aspect of the exemplary embodiment.

FIG. 4 illustrates an exemplary method for retrieving text, such as problem statements and solutions, from a knowledge base which is responsive to a user query. It will be appreciated that the method may include fewer or more steps than those shown and that the method need not proceed in the order described.

The method begins at S100. At S102, a query input by a user is received. At S104 and S106 device data may be requested and received. For example, at S104, the troubleshooting system prompts the device for device data and at S106, prompts the diagnostic engine for diagnostic data. The data, when received, may be stored in memory 20. At S108, the received device data is linked to the model 62 of the device. As will be appreciated, some or all of steps S104, S106, S108 may be performed prior to receipt of a user query.

At S110, problem statements may be retrieved from the knowledge base which match the user's query, i.e., which are at least partially responsive to the user's query. Retrieved problem statements may be those which include one or more words of the query or which include words considered by the knowledge base to be equivalents. The results may be filtered to identify the most probable matches.

In particular, at S10, the search module 14 may execute instructions for receiving a natural language query input by a user that describes a problem with a device, dividing the user query into words, and optionally identifying normalized forms of these words. The text searching module may utilize an incremental parser for this process, such as the Xerox Incremental Parser (XIP), as described, for example, in U.S. Patent Publication No. 20050138556 and U.S. Pat. No. 7,058, 567, incorporated herein by reference in their entireties, and in the following references: Aït-Mokhtar, et al., "Incremental Finite-State Parsing," Proceedings of Applied Natural Language Processing, Washington, April 1997; Aït-Mokhtar, et al., "Subject and Object Dependency Extraction Using Finite-State Transducers,"

Proceedings ACL'97 Workshop on Information Extraction and the Building of Lexical Semantic Resources for NLP Applications, Madrid, July 1997; Aït-Mokhtar, et al., "Robustness Beyond Shallowness: Incremental Dependency Parsing," NLE Journal, 2002; and Aït-Mokhtar, et al., "A Multi-Input Dual-Entry Point Dependency Parser," in Proceedings of Beijing, IWPT 2001.

Text strings (generally problem statements 56 or parts thereof) are retrieved from the knowledge base 30 which contain at least one of the words (or a word with the same normalized form as one of the words), each of the problem statements being associated with at least one solution sequence 58 for addressing the problem with the device.

At S112, if none of the retrieved problem statements exactly matches the user's query, proposed refinements may be presented to the user via the GUI which allow the user to refine the query. Each refinement may comprise a linguistically coherent expression, such as a phrase, and be used to generate a refined set of problem statements, based on the user's selections.

In particular, at S112, the search module 14 may execute instructions for generating refinements to the user's query, by identifying subparts of the query and for presenting the subparts as query refinements, and for presenting coherent expressions from the retrieved problem statements which relate to a selected subpart and which represent different meanings of the user's query for disambiguating user queries, and instructions for presenting alternatives for extension of the user's query as query refinements.

As further described in application Ser. Nos. 11/544,200 and 11/354,688, the query refinements may be presented in the form of syntactic units. Each syntactic unit may be a linguistically coherent expression which is a sequence of words in the same sentence which are grammatically related, such as a noun phrase, a prepositional phrase, adverbial phrase, adjectival phrase, verbal syntactic unit, combination of these, or the like. For example, in the problem statement sentence: "The printer does not respond"; the words "does not respond" may be presented to the user as a syntactic unit for refinement of the query. The refinements may be presented to the user in the form of a navigation tree, in which query refinements are linked to further query refinements, as described for example, in Ser. No. 11/544,200. In this embodiment, at least a group of the problem statements are represented as a navigation tree in which each of a plurality of selectable nodes of the navigation tree comprises an expression representative of at least one syntactic unit in at least one of the identified problem statements. The expression may be the syntactic unit itself or an underling concept which groups two or more syntactic units having the same meaning. Relationships between syntactic units are used in structuring the nodes of the navigation tree such that, in navigating the tree, a user selects nodes which refine the query.

At S114, the device data 48 for the identified problem statements is retrieved. In particular, at S114, the meta-data associated with each of the retrieved problem statements may be extracted. The device data related to a potential problem with the device which is linked to the same nodes of the diagnostic model 62 as this meta-data is then identified.

At S116, the device data may be used in ranking the retrieved problem statements/solutions. This may include using configuration data to identify any problem statements relating to components not operating on the device and according these a lower ranking and raising the ranking of any problem statements for which the diagnostic engine 34 has identified a potential problem with the device.

At S118, retrieved problem statements 56 may be presented to the user. The presentation may be informed by that portion of the device data which is linked to the same concept node of the model as a retrieved problem statement. In one embodiment, this includes prioritizing the presented problem statements according to the ranking which is informed by the device data. In another embodiment, this may include identifying problem statements which are compatible with the diagnostic data, e.g., which are linked to the same concept node of the model.

At S120, the user may select one of the problem statements, e.g., by clicking on it, and at S122 candidate solutions 58 associated with the problem statement may be presented to the user via the GUI. The presentation of the candidate solutions may be informed by that portion of the device data that is linked to one or more of the solutions via the model 62. The user may attempt one of the solutions on the device, which in turn may affect the search results for a subsequent query. The method ends at S124.

The integration of the device data in the exemplary method described above will now be described in greater detail.

1. Diagnostic Data

As noted above, the diagnostic data may be provided by a diagnostic engine 34, which may take the form of a rule-based system. Each of the possible diagnoses which may be output by the diagnostic engine is linked to the appropriate node(s) of the model. Thus, when a specific diagnosis is output, the relevant node(s) can be identified. In some cases, a diagnosis of the fault may be made from the device data without the need for user input. The diagnosis may then be in the form of a list of references to cases and/or solutions of the knowledge base. However, this completely automated type of diagnosis will not always be possible for several reasons. First, the device may not be accessible to the network for transmission of the information. Second, there are a variety of known problems that the device's sensors 42 cannot detect, or can detect only with low confidence, or with limited specificity. In those cases, one option is to associate a probability to a diagnosis to model the level of confidence associated with it and rank the likelihood of success of a particular solution appropriately. Another option is to have a diagnostic engine 34 that sends a partial diagnosis to the troubleshooting system. A partial diagnosis denotes a class of problems instead of one specific case. This can be done by using hierarchically defined concepts of the knowledge base to define the classes of problems and by having the diagnosis refer to one of these concepts. For example, the diagnosis may provide that a problem is associated with the document feeder, without specifying a particular type of feeder.

The diagnostic data may be used to rank the success likelihood of cases and solutions which are being referenced as follows:

a. A complete diagnosis is used to increase the success likelihood of the case and/or solution it makes reference to.

b. A partial diagnosis is used to increase the success likelihood of all the cases classified under the concept it makes reference to.

c. When a diagnosis is given with a degree of confidence, this data is used to weight the level of success likelihood that will be given to the related cases and/or solutions.

As will be appreciated, the diagnostic information can correspond to a combination of different problems happening simultaneously on the device or to different partial diagnosis of the same problem with possibly different levels of confidence. The likelihood of success, as evaluated by the troubleshooting system 10, may be articulated to the user via the GUI. In one embodiment, the order of displayed problem statements and/or solutions at steps S118, S122 is based, at least in part, on the ranking. In another embodiment, at S122 visual indicia are used to identify solutions which are more likely than others, based on the device and/or diagnostic data. The indicia may comprise, for example, a color in which the solutions are highlighted, a symbol indicating that the solution is consistent with the device data, or other indicia which indicate to the user that the solution is favored by the diagnostic data. In another embodiment, the problem identified by the diagnostic engine is displayed at S122. In yet another embodiment, solutions which are identified from the device data as having previously attempted, or partially attempted may be identified as such at S122. A combination of two or more of these approaches may be utilized in presenting the solutions.

2. Configuration Data

Information on the actual configuration of the device 36 may be provided to the troubleshooting system 10. This information may include information on the hardware and software components present in the device and related information, such as their version, model, type, working mode, etc. The configuration information may be stored on the device 36. Some of this information can be collected from the device using standard protocols such as SNMP (Simple Network Management Protocol), DMTF (Distributed Management Task Force), or other appropriately constructed proprietary interface.

Each piece of configuration is associated with a concept node of the knowledge base diagnostic model 62. This is similar to what was defined for the partial diagnosis, however this information is different from the diagnostic information because it does not suggest the presence of a problem in a component but provides an exhaustive description, i.e., the validity (present or not present) of each of the concepts linked with a configuration datum, e.g., presence of a finisher on a printer.

The configuration data can therefore be used to perform a type of 'negative' inference. When a feature, such as a particular type of finisher, is not present in the device 36, then all the problems classified as relevant when this feature is present can be assigned a lower success likelihood. For example, if the class of device being analyzed can have several types of components and the specific device being analyzed has one particular component but does not have others in the class, solutions which apply to the other types of component should be assigned lower success likelihood. This information may be used for lowering the ranking of cases/solutions that are incompatible with the hardware and software complement of the device being diagnosed. For example, if a class of printers may be supplied with plural types of finisher and the printer is configured with a first of the types, problem/solutions relating only to the second type of finisher may have their ranking lowered, which, in some cases, may result in the solution being pruned from those presented to the user.

The current status of the component may be similarly used to inform the likelihood of success of problems related to this component. If a component is present in the device, then the problems categorized as relevant should receive a lower success likelihood when this component is switched off.

c. Device Historical Data and Current Status

In various aspects of the exemplary method, information from recent history and/or the current status of the device is used to provide context to the presentation of the solutions. For example, at S122, the user may be presented with information on solutions which have been previously attempted, either partially or completely. This can spare the user from repeating unsuccessful operations. In particular, information on operations typically associated with maintenance or repair of the device, such as the following may be provided to the user: manipulations of mechanical parts, (e.g. opened/closed valves, access panels, doors, or trays); functions recently used; and recent maintenance/troubleshooting operations. In one embodiment, the solutions or solution steps previously attempted are differentiated from other solutions/solution steps, for example by graying out the text describing the actions "already performed" in the solution descriptions. Additionally, the historical data may be used for modifying the ranking of candidate solutions. For example, if the toner has been recently replaced, this solution will be lowered in the ranking and thus less likely to appear among the first few candidate solutions displayed.

The method illustrated in FIG. 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 4, can be used to implement the troubleshooting method.

Figure 5:
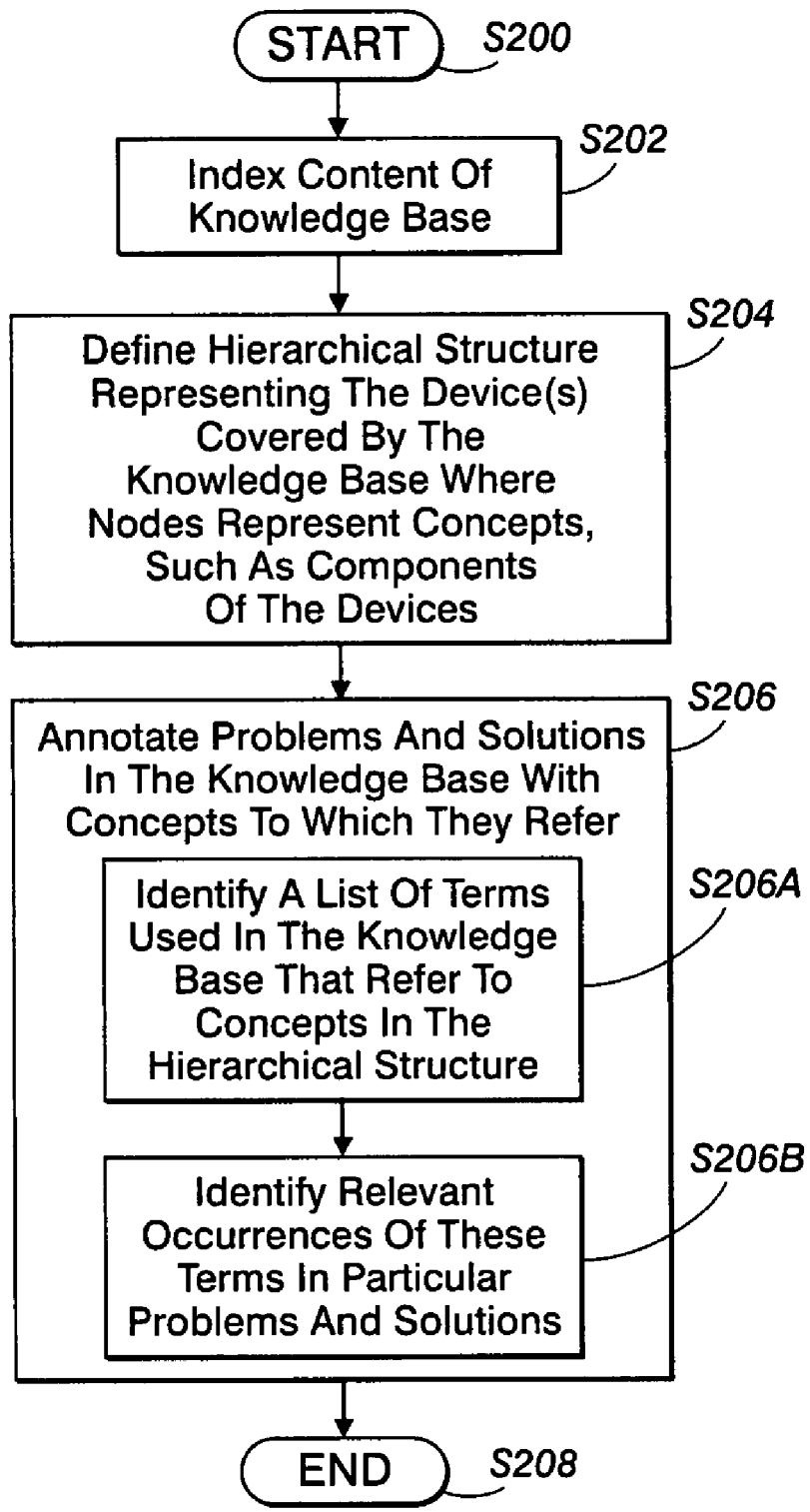
FIG. 5 illustrates a method for developing a troubleshooting system in accordance with another aspect of the exemplary embodiment.

FIG. 5 illustrates a method of generating the knowledge base 30. Briefly, the method of Ser. No. 11/354,688 relies on NLP techniques to annotate a trouble-shooting corpus, in which printer breakdown problems and their solutions have been described in natural language, such as English, with information about synonyms and the boundaries of syntactic units (linguistically coherent expressions). The NLP-based method allows a user to dynamically and iteratively specify queries over this representation of the corpus.

In the present embodiment, the method of generating the knowledge base may be similar to that of Ser. No. 11/354,688 with additional steps relating to the association of meta-data with the knowledge base 30 which links the annotated corpus to the diagnostic structure exemplified in FIGS. 2 and 3. The exemplary method begins at S200. At S202, an initial indexing of the content of the knowledge base may be performed, in order to support a dynamic query specification. At S204, an ontology 62 is defined, of the type illustrated in FIGS. 2 and 3. At S206, the knowledge base text may be annotated with references to concepts in the ontology 62. The method ends at S208. Further details of these steps will now be described.

The indexing process (S202) is specifically designed to store linguistic information. The indexing identifies the syntactic structure of the content of the knowledge base 30. The indexing may be performed according to the method outlined in Ser. No. 11/354,688, incorporated by reference. Briefly, a parsing system for annotating and indexing a manual or other document(s) to populate the knowledge base 30 takes as input natural language text, parses the text, and tags (indexes) the document(s). The parsing system can be a general-purpose computer, such as a desktop PC, a laptop PC, a workstation, a server, or a mainframe computer on which parsing instructions are loaded as software or a dedicated processing device. Input documents in electronic form are stored in memory and processed in the manner described below. In the case of a manual, the document(s) may comprise problem descriptions and associated solution sequence(s). The annotation indicates the grammatical structure of the problem statements (problem description and optionally also the associated solution text), allowing for the presentation of linguistically coherent refinement choices in the form of a navigation tree. In general, the parser includes instructions for syntactically, semantically, and lexically analyzing the text content of the problem statements (i.e., the problem descriptions and optionally also the solutions) and identifying relationships between text fragments in the problem statements. The annotated documents are stored, for example in a relational database or as an enriched XML file. The annotated documents comprising the knowledge base 30 can be located in any suitable storage medium, such as a disk, hard drive, Internet server, or the like. Along with XML, other structured formats that include structuring schema or other explicit organization can be used to provide a common structured document format for the annotated documents.

The parser annotates the problem statements with tags (labels). The labels may list synonyms for expressions in the text, delineate syntactic units, and indicate relationships between syntactic units. These tags are used to index the documents in the knowledge base 30. The rules that generate these tags may be based on lexical and syntactic information. Lexical information may include a word's part of speech (e.g. noun or verb) and its normalized form (e.g., the normalized form of "printing" is "print"). Syntactic information may include dependencies between words, such as the relationship between a subject and its object or the relationship between a verb and its object (e.g., in the phrase "the machine makes noises," there is an OBJECT type of dependency between "make" and "noise").

The parser may include several modules for linguistic analysis. Each module works on the input text, and in some cases, uses the annotations generated by one of the other modules, and the results of all the modules are used to annotate the problem statements. Thus, several different grammar rules may eventually be applied to the same problem statement or fragments (such as words, phrases) thereof.

In S204, the ontology of the device or class of devices may be structured in identify all the components, including optional components, of the device(s), with which faults may occur, making links between components and concept nodes which group together components.

In S206, the meta-information 60 can be associated with the knowledge base 30 either completely manually, or in a more sustainable way using a Natural Language Processing (NLP) based approach. A manual approach may be time consuming since a typical troubleshooting knowledge base may have thousands of problems which may be classified according to several hundred different concepts. In one embodiment, NLP techniques may be used to provide automatic support for maintaining the mapping between the knowledge base text and the ontology to which the diagnostic rules refer.

The task of annotating knowledge base text with concepts from the ontology (S206) can be decomposed into two sub-tasks, both of which may be supported by NLP tools: The first subtask involves identifying terms used in the knowledge base that refer to concepts in the ontology (S206A). The second involves identifying relevant occurrences of these terms in particular problems and solutions, in order to annotate those problems and solutions with the appropriate concepts from the ontology (S206B). At the end of S206, units of the knowledge base are annotated with the relevant concepts.

The first sub-task (S206A) may include assembling, for each concept in the ontology, a list of terms whose presence in a knowledge base entry can indicate that the concept is relevant to that entry. Typically, each node of the ontology will be labeled with a term intended to explain the node's meaning, but other synonymous or related terms that are also indicative of the concept may be present in the knowledge base 30. A term extraction tool may be used to collect a list of candidate terms. For example, the term extraction tool may identify words or phrases, particularly noun phrases, such as "finisher" and "document feeder". This could be supplemented by some manual input. For example, an editor may go through this list and assign terms to concepts as appropriate. Such a tool could greatly reduce the amount of time needed to collect the term lists, compared to reading through all of the knowledge base text, by filtering out irrelevant text, and by presenting each candidate term only once. The tool could perform syntactic and morphological normalization in order to further reduce the size of the list presented to the editor. Morphological normalization would be somewhat useful even for English (e.g., the singular and plural forms of a noun could be combined into a single list entry), but could be much more so for languages such as the Slavic languages that have richer inflection patterns. In addition to listing terms, the tool could also group them into categories, e.g. part names, symptom descriptions, and version numbers, to facilitate the editor's search for terms to be associated with a particular concept.

In one embodiment, the term extraction tool may be implemented in a rule-based system, such as with a parser such as the Xerox Incremental Parser (XIP), or as a machine learning module that is trained on a subset of the knowledge base annotated by hand. A description of an exemplary parser is to be found in U.S. Pat. No. 7,058,567, entitled NATURAL LANGUAGE PARSER, by Aït-Mokhtar, et al., incorporated herein by reference.

Once a list of terms has been associated with each concept of the ontology, the second sub-task (S206B) is to use these term lists to identify instances of a unit (problem statement/solution or part thereof) in the knowledge base which refer to the concept. In one embodiment, this step may include searching for all occurrences of the identified terms as literal strings in the knowledge base. In another embodiment, NLP tools may be used to yield a higher quality mapping. The NLP tools may be used in several ways. One is to apply syntactic and morphological normalization to increase the recall of the search, as discussed above. For example, several terms in the knowledge base (such as line and lines) may be recognized as equivalent to a term (e.g., line) in the ontology. Another way is to analyze the linguistic context of each term occurrence to see if the concept in question is mentioned in a way that is relevant for the purposes of selecting a solution. For example, it may be beneficial to distinguish between references to the finisher that are central to the entry's content, e.g. "jam in the finisher," from those that are merely incidental, such as "if there is a finisher on the left side, grasp the top of the finisher and slide it completely to the left to expose the duplex module". Many techniques commonly used in information retrieval systems could be used to make such distinctions, e.g. hand-written pattern-matching rules based on regular expressions or a full syntactic analysis, or automatically trained classifiers. For example, one rule could specify that the phrase "if there is a finishes" is not sufficient to cause the solution statement to be annotated with a reference to the concept "finisher".

Although by the end of S206, some or a majority of the problem statements/solutions 56, 58 in the knowledge base 30 may be linked to appropriate concept nodes in the model 62 in this way, in some embodiments, not all problem statements/solutions are linked to the model 62. For example, there may be problem statements related to problems for which it is not practical or impossible to acquire any device data. Thus, for such problems, it is not necessary to create a link to the model 62.

Without intending to limit the scope of the exemplary embodiment, the following example describes one use of the exemplary system and method described herein.

Example

A system for diagnosis of problems arising in marking devices, such as printers, copiers, and multifunction devices, is described in above-mentioned application Ser. No. 11/544,200 and 11/354,688. In the exemplary embodiment, such a system is adapted to inform the search with information derived from device data. As will be appreciated, a marking device is representative of a typical electromechanical system with recursively defined subsystems and components. The exemplary system provides a user troubleshooting such a device the ability to search among the set of possible solutions to the problem that the user is experiencing. In this embodiment, the search is informed both by configuration data and diagnostic data. Configuration data may be provided by software on the marking engine platform 46. One such software system is the Xpresso™ system developed by Xerox. This system looks for events on the device, such as paper jams, barometric changes, or other incidents and then draws on diagnostic data collected within the device for identifying a source of the problem. Diagnostic data is provided by a diagnostic rules engine 34 as described in above-mentioned application Ser. No. 11/425,277. As described, in that application, the device initiates a conversation with a communication host in response to either an internally detected condition or a human (customer or customer service engineer) initiated session. The communication host gathers data from the customer device and converts that information into correct semantic form, inserting the information into a database which may contain historic device data. The communications host is responsible for receiving network communications and providing consistent semantics across device types and device applications. Once the data has been placed in correct form, a connection to a diagnostic server on which the diagnostics engine resides may be established. The rules engine 34 may apply rules in a sequence defined by a diagnostic tree. In some instances, further information may be requested from the device to complete the analysis. In some cases, the diagnostic engine 34 may request that the device perform certain tests designed to provide information for identifying a solution. In some cases, a solution may be identified which can be corrected automatically by the device. In other cases, as noted above, a complete diagnosis may not be possible with the device data alone.

Using the GUI 32, the user can enter a free text string describing the problem in his or her own words. The words are used to build a representation of disambiguation and refinement possibilities as well as cases and solutions containing text units matching the query words. The process of matching the text to knowledge base cases and solutions can be performed as described in detail in application Ser. Nos. 11/354,688 and 11/544,200.

Figure 6:
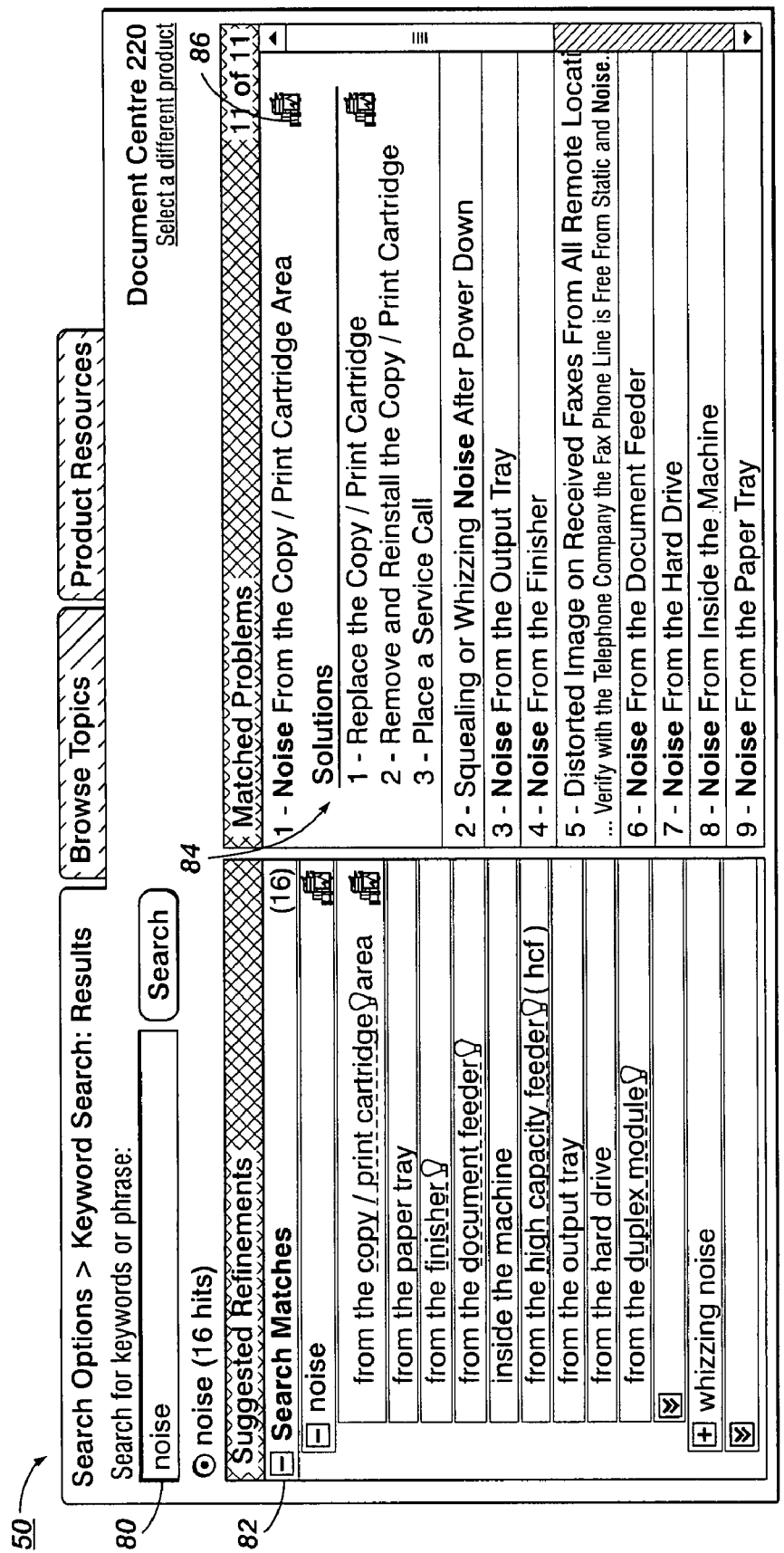
FIG. 6 illustrates a web browser operating in a graphical user interface.

As illustrated in FIG. 6, which shows a screen shot of a web browser displayed on the GUI visual display 50, the troubleshooting system 10 returns a set of results (cases and solutions) also offering some possible refinements for the search in the form of a refinement tree similar to that described in application Ser. No. 11/544,200. For example, the user has entered the query "noise" in the search box 80 on the GUI. The retrieved problem statements are linked to two alternative sub queries under the headings "noise" and "whizzing noise." Proposed refinements to the selected sub-query, "noise" (such as: "from the copy/print cartridge area") are listed in a drop down box 82. Because the first problem statement refinement is also compatible with the device data, this refinement has been raised in the ranking, in this case, to the top of the list. Solutions are presented in the adjoining solutions box 84.

Cases and solutions as well as the refinement tree nodes are annotated and ranked by taking into account device configuration data and complete diagnostic data. In the list of cases and solutions, the rank of an item is positively influenced if it matches the device data diagnosis. Data about the device's configuration can be used to demote irrelevant cases to a position lower in the list. Printer icons 86 are used as visual indicators showing the user results and refinements that are compatible with the diagnostic results obtained by analyzing the device data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for troubleshooting a problem with a device, comprising:
    with a computing device, acquiring device data for the device, the device data including device configuration data;
    receiving a user's query concerning a device in a natural language;
    presenting possible refinements to at least a portion of the user's query for defining a problem statement;
    providing a diagnostic model of the device, the diagnostic model being defined as a hierarchical structure in which a plurality of nodes of the structure each represent a concept related to the device or to a class of devices to which the device belongs, each of a plurality of the problem statements in the knowledge base being linked to a selected one or more of the concepts represented in the hierarchical structure;
    linking, with the computing device, acquired device configuration data to at least one of the problem statements and candidate solutions through the diagnostic model of the device; and
    presenting candidate solutions that are associated with the defined problem statement in a knowledge base, at least one of the presentation of possible refinements and the presentation of candidate solutions being informed by acquired device data that is linked through the diagnostic model of the device to at least one of the problem statements and candidate solutions.

2. The method of claim 1, wherein the acquiring of device data for the device includes acquiring the device data from at least one of the device and a diagnostic engine in communication with the device.

3. The method of claim 1, wherein the acquiring of device data for the device further includes acquiring at least one of:
    device history data; and
    device current status data.

4. The method of claim 3, wherein the acquiring of the device data for the device includes acquiring device diagnostic data, the device diagnostic data being used to modify the ranking of at least one of the presented refinements and solutions that is linked to the device diagnostic data by the diagnostic model where the diagnostic device data identifies a potential problem with the device.

5. The method of claim 3, wherein the acquiring of the device data for the device includes acquiring device diagnostic data, the device diagnostic data comprising one of the group consisting of:
    a. a complete diagnosis, which is used to increase the success likelihood of a problem statement or solution to which it relates;
    b. a partial diagnosis, which is used to increase the success likelihood of all the problem statements classified under a concept to which it relates; and
    c. a degree of confidence, which is used to weight the level of success likelihood of a related problem statement or solution.

6. The method of claim 3, wherein the acquiring of the device data for the device includes acquiring device diagnostic data, the device diagnostic data is being used to identify solutions which are consistent with the device data.

7. The method of claim 3, wherein the acquiring of the device data for the device includes acquiring device history data, the device history data being used to identify solutions which have been previously at least partially attempted on the device.

8. The method of claim 1, wherein the receiving of the user's query concerning a device in a natural language includes receiving a query input on a graphical user interface.

9. The method of claim 1, wherein the presenting of possible refinements to at least a portion of the user's query includes presenting query refinements in the form of a navigation tree.

10. The method of claim 9, wherein a ranking of the refinements is based at least in part on the device data.

11. The method of claim 9, further comprising, identifying query refinements that are compatible with the device data.

12. The method of claim 11, wherein the identifying includes providing visual indicators for the presented solutions which are compatible with the device data.

13. The method of claim 1, further comprising determining a likelihood of success of a candidate solution based on the device data.

14. The method of claim 1, wherein the presentation of refinements of the user's query further comprises presenting subparts of the user's query as alternate queries.

15. The method of claim 1, wherein the refinements to the user's query are presented as syntactic units selected from the group consisting of noun phrases, prepositional phrases, adverbial phrases, adjectival phrases, verbal syntactic units, and combinations thereof.

16. The method of claim 1, further comprising:
generating the diagnostic model for informing results of a troubleshooting search with device data, comprising:
defining an ontology of a device or class of devices to which the device belongs, the ontology having a tree structure in which nodes of the structure define concepts; and
linking cases in a knowledge base relating to defined problems with the device to selected ones of the nodes, enabling device data relating to a concept to be linked to cases in the knowledge base that are linked to that concept.

17. The method of claim 16, wherein the linking includes applying natural language processing techniques to the cases to detect positive references to a node and distinguish them from neutral references.

18. A method for troubleshooting a problem with a device, comprising:
with a computing device, acquiring device data for the device, including device configuration data,
receiving a user's query concerning a device in a natural language;
presenting possible refinements to at least a portion of the user's query for defining a problem statement;
presenting candidate solutions that are associated with the defined problem statement in a knowledge base, at least one of the presentation of possible refinements and the presentation of candidate solutions being informed by acquired device data that is linked through a diagnostic model of the device to at least one of the problem statements and candidate solutions, the device configuration data being used to modify, with a computing device, a ranking of at least one of the presented refinements and solutions linked to the device configuration data by the diagnostic model where, from the configuration data, a component which is not in use on the device is identified.

19. A computer program product comprising a non-transitory computer-readable recording medium encoding instructions, which when executed on a computer causes the computer to perform a method comprising:
acquiring device data for a device including device configuration data;
receiving a user's query concerning a device in a natural language;
presenting possible refinements to at least a portion of the user's query for defining a problem statement; and
presenting candidate solutions that are associated with the defined problem statement in a knowledge base, at least one of the presentation of possible refinements and the presentation of candidate solutions being informed by device configuration data that is linked through a diagnostic model of the device to at least one of the problem statements and candidate solutions, the device configuration data being used to modify the ranking of at least one of the presented refinements and solutions linked to the device configuration data by the diagnostic model where, from the configuration data, it is inferred that a component is not in use in the device.

20. A system for troubleshooting a problem with a device, comprising:
a computing device comprising:
a device data acquisition module which acquires device data for the device including device configuration data;
a text searching module which receives a user's query concerning a device in a natural language, generates possible refinements to at least a portion of the user's query for defining a problem statement, and retrieves candidate solutions that are associated with the defined problem statement in an associated knowledge base; and
an integration module which integrates device data including device configuration data which is linked in a model of the device with at least one of the possible refinements and candidate solutions for informing the presentation of the possible refinements and presented candidate solution, wherein the acquired device configuration data is used to modify a ranking of at least one of the presented refinements and solutions linked to the device configuration data by the diagnostic model when, from the acquired configuration data, it is inferred that a component to which a refinement or candidate solution relates is not in use on the device.

21. The system of claim 20, further comprising memory which stores acquired device data and the model of the device.

22. The system of claim 20, further comprising a graphical user interface for inputting a user inputs a query and displaying possible refinements and candidate solutions.

23. The system of claim 22, wherein the graphical user interface is configured for representing at least a group of problem statements as a navigation tree in which each of a plurality of selectable nodes comprises an expression representative of at least one syntactic unit in at least one of the identified problem statements and wherein relationships between syntactic units are used in structuring the nodes of the navigation tree, whereby in navigating the tree, a user selects nodes which refine the query.

* * * * *